United States Patent [19]

Wells

[11] Patent Number: 5,430,361

[45] Date of Patent: Jul. 4, 1995

[54] INTEGRATED ANTI-BACKLASH GEARHEAD MOTOR

[75] Inventor: Michael L. Wells, Newhall, Calif.

[73] Assignee: Hughes Aircraft Company, Los Angeles, Calif.

[21] Appl. No.: 77,169

[22] Filed: Jun. 14, 1993

[51] Int. Cl.$^6$ .................. F16H 57/12; H02P 7/69; H02P 7/747

[52] U.S. Cl. ..................... 318/630; 318/625

[58] Field of Search ............ 318/630, 625, 8, 9, 318/11, 12, 13, 14, 15, 45

[56] References Cited

U.S. PATENT DOCUMENTS

| | | |
|---|---|---|
| 1,076,614 | 10/1913 | Thomas . |
| 1,221,391 | 4/1917 | Thullen . |
| 2,740,909 | 4/1956 | Chapman . |
| 3,161,083 | 12/1964 | Roe . |
| 3,434,025 | 3/1969 | Parkinson et al. . |
| 3,862,444 | 1/1975 | Hale . |
| 4,158,845 | 6/1979 | Pinson . |
| 5,100,271 | 3/1992 | Kameyama et al. ......... 409/231 |

FOREIGN PATENT DOCUMENTS

| | | |
|---|---|---|
| 0076359 | 4/1983 | European Pat. Off. . |
| 0428783 | 5/1991 | European Pat. Off. . |
| 3444420 | 6/1986 | Germany . |
| 0279432 | 6/1990 | Germany . |
| 9110945 | 1/1992 | Germany . |
| 1-047291 | 2/1989 | Japan . |
| 0727919 | 4/1980 | U.S.S.R. . |

Primary Examiner—Bentsu Ro
Attorney, Agent, or Firm—Hugh P. Gortler; Michael W. Sales; Wanda K. Denson-Low

[57] ABSTRACT

A drive system comprising an integrated gearhead motor system that produces relatively high torque output with minimal backlash. The present invention uses two axially mounted electric or air motors and gearhead assemblies integrated into a single unit. The two motor and gearhead assemblies are connected to concentric output drive shafts, and each output shaft mates to a respective gear of a split gear assembly. The split gear assembly is coupled to a drive shaft of a device that is to be driven by the system. A tachometer is coupled between the first motor and a position sensor is coupled to the drive shaft of the device that is to be driven. The tachometer and position sensor are coupled to a controller that is used to control the respective torques provided by the two motors in response to rate and position signals provided thereby. By controlling the relative amount of torque provided by the two motors, the split gear assembly removes the backlash from the gearheads and gear interfaces to the drive shaft of the device that is to be driven. The present invention incorporates the two motors and two gearhead assemblies into a single assembly, reducing weight and space requirements. The design of the present invention also permits retrofitting of the drive system into existing single motor drive systems.

17 Claims, 2 Drawing Sheets

INTEGRATED ANTI-BACKLASH GEARHEAD MOTOR

This invention was made with Government support under Contract F04606-90-D-0004 awarded by the Department of the Air Force. The government has certain rights in this Invention.

BACKGROUND

The present invention relates generally to motors, and more particularly, to an integrated gearhead motor assembly incorporating two motors and two gearhead assemblies that provides for relatively high torque output with minimal backlash for use in precision servo systems.

In the past, hydraulically controlled drive systems have been employed to provide for a drive system that produces a large amount of torque. Such drive systems are used in antenna control systems, for example. The hydraulic drive systems inherently produce little or no backlash, and are therefore very accurate when used to control the pointing of an antenna. However, conventional hydraulic drive systems are prone to leakage, which is a definite drawback.

Previous anti-backlash electric motor drive systems required two independent motors acting on a drive assembly. The only known single assembly electrical drive device developed for low backlash applications is a direct drive torquer motor, but this device provides only limited torque output.

Therefore, it is an objective of the present invention to provide an integrated electric gearhead motor assembly incorporating two motors and two gearhead assemblies integrated into a single housing that provides for relatively high torque output and minimal backlash. It is a further objective of the present invention to provide for an integrated gearhead motor assembly incorporating either two electric motors or two air motors and two gearhead assemblies integrated into a single housing.

SUMMARY OF THE INVENTION

In order to meet the above and other objectives, the present invention provides for an integrated gearhead motor system that produces relatively high torque output with minimal backlash. The present invention may incorporate AC or DC electric motors or air motors, for example. In one embodiment, the present invention uses two axially mounted electric motor and gearhead assemblies. The two motor and gearhead assemblies are connected to concentric output drive shafts, and each output shaft mates to a respective one of the gears of a split gear assembly. The split gear assembly is coupled to a gear of the drive shaft of a device that is to be driven by the integrated gearhead motor assembly. A tachometer is coupled between the first motor and to a controller that is used to control the respective torques provided by the two motors. By modulating the relative amount of torque provided by the two motors, the split gear assembly removes the backlash from the gearhead assemblies and gear interfaces to the drive shaft of the device that is to be driven. The present invention does this as an integrated assembly, and is adapted to replace a conventional single gearhead motor or hydraulic motor assembly. A second embodiment replaces the electric motors with air motors.

More specifically, the present invention is a drive system that comprises a gearhead motor system for driving an output device. The drive system comprises first and second motors having first and second output shafts, respectively. A first gearhead assembly is coupled to the first output shaft of the first motor and has a first output drive shaft. A second gearhead assembly is coupled to the second output shaft of the second motor and comprises a second output drive shaft that is concentric with the first output drive shaft of the first gearhead assembly. A split gear assembly having first and second gear portions is coupled to respective output drive shafts of the first and second gearhead assemblies. The first and second gear portions are coupled by way of a drive gear to the output device.

The drive system may further comprise a position sensor coupled to the drive gear for providing a position output signal indicative of the relative angular position of the drive gear and that is used to control the amount of torque provided by the drive system. A tachometer is coupled to a selected motor that is adapted to provide an angular rate output signal that is used to control the amount of torque provided by the drive system. Control circuitry is coupled to the tachometer, to the position sensor, and to each of the motors for control the amount of torque provided by the drive system to the output device in response to the position and rate output signals.

The present invention thus provides for a single integrated assembly that is adapted to eliminate gear train backlash. The present invention incorporates the two motors and two gearhead assemblies into a single assembly, reducing weight and space requirements. The design of the present invention also permits retrofitting of the dual motor and gearhead motor assembly into existing single motor drive systems. Conventional anti-backlash systems that use torquer motors cannot provide the output torque of the gearhead motor assembly of the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
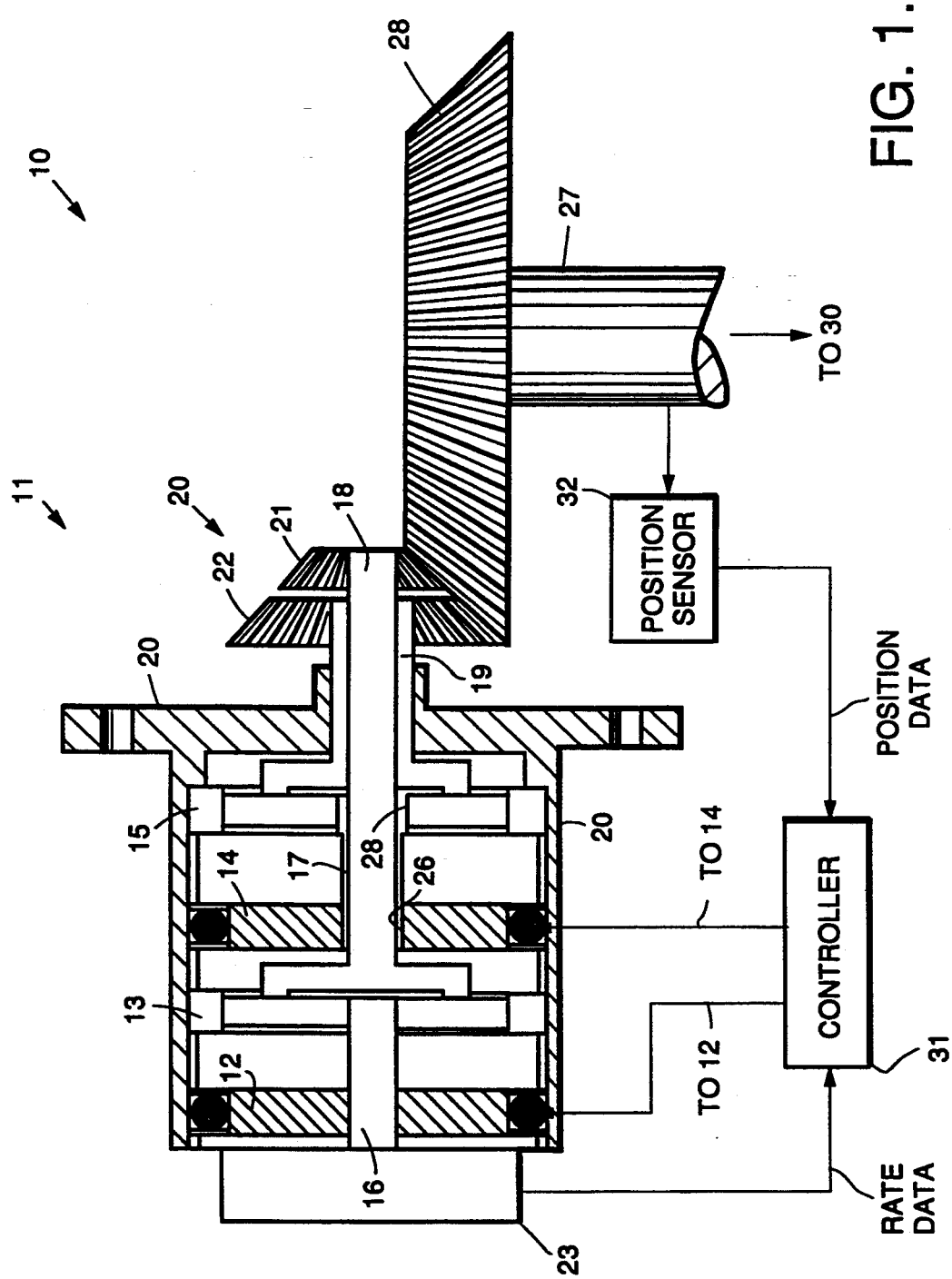
FIG. 1 is a cutaway side view of a drive system comprising an integrated gearhead motor assembly in accordance with the principles of the present invention that incorporates two motors and two gearhead assemblies that provides for relatively high torque output with minimal backlash.

Referring to FIG. 1, it shows a cutaway side view of a drive system 10 comprising an integrated gearhead motor assembly 11 in accordance with the principles of the present invention. The integrated gearhead motor assembly 11 incorporates two motors and two gearhead assemblies to minimizes backlash produced by the system 10. The integrated gearhead motor assembly 11 is comprised of a housing 24, which may be comprised of metal or plastic, or the like. A first motor 12, which may be comprised of an electric motor similar to a model 3439129 electric motor, manufactured by MPC, for example, has an output shaft 16 that is coupled to a first gearhead assembly 13. The first gearhead assembly 13 may be comprised of a model 3439129 gearhead assembly, manufactured by MPC, for example. The first gearhead assembly 13 has a first output shaft 18 that projects from an opening 25 in the housing 24. The first output shaft 18 of the first gearhead assembly 13 has a first diameter, which may be 0.375 inches, for example. The first motor 12 may alternatively be comprised of an air motor.

A second motor 14, which may be comprised of an electric motor, for example, and which is unique to the present invention, is coupled to a second gearhead assembly 15 by way of a second output shalt 17. The second motor 14 may alternatively be comprised of an air motor. The second gearhead assembly 15 is also unique to the present invention and is adapted to mate with the second motor 14 and cooperate with the first motor 13 and its output shaft 18. The uniqueness of the second motor 14 relates to an opening 26 in its center that permits the first output shaft 18 of the first motor 12 to project therethrough, and its output shaft 17. The uniqueness of the second gearhead assembly 15 relates to an opening 28 in its center that permits the first and second output shafts 17, 18 to project therethrough.

The second gearhead assembly 15 has a second output shaft 19 that also projects from the opening 25 in the housing 24. The second output shaft 19 of the second gearhead assembly 15 is formed in the shape of a tube having an inner diameter through which the first output shaft 18 extends. The second output shaft 19 of the second gearhead assembly 15 has an inner diameter that is larger than the outer diameter of the first output shaft 18 first gearhead assembly 13, and which may be 0.387 inches, for example. The output diameter of the output shaft of the second gearhead assembly 15 may be 0.75 inches, for example. The first and second output shafts 18, 19 of the gearhead assemblies 13, 15 are free to rotate without interference with each other. The second motor 14 is also separated from the first gearhead assembly 13 and has the opening 26 in the center thereof through which the first output shaft 18 of the first gearhead assembly 13 projects.

The two output shafts 18, 19 of the first and second gearhead assemblies 13, 15 are concentrically arranged and each output shaft 18, 19 mates to a respective gear 21, 22 of a split gear assembly 20. The split gear assembly 20 is coupled to a drive gear 28 of a drive shaft 27 of an output device 30 that is to be driven by the integrated gearhead motor assembly 11 or drive system 10. A tachometer 23 is disposed at one end of the housing 24 and is coupled to the first motor 12. The tachometer 23 may be comprised of a tachometer used on the model 3439129 motor, manufactured by MPC, for example. The tachometer 23 is also coupled by way of a controller 31 to internal control circuits of each of the motors 12, 14 and is adapted to control the amount of torque produced thereby that is coupled to the output device 30.

Figure 2:
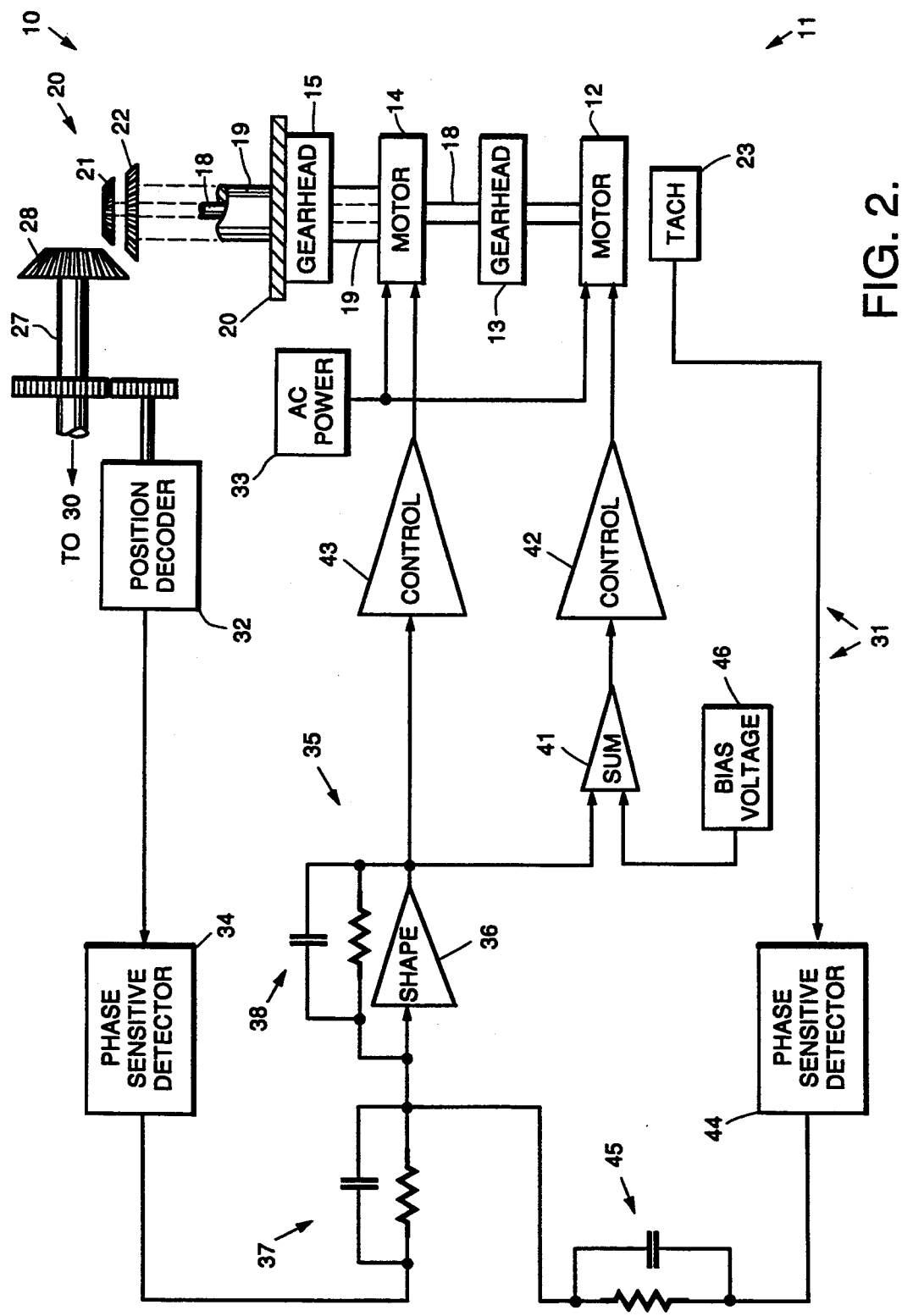
FIG. 2 shows control circuitry that is employed in the drive system of FIG. 1.

FIG. 2 shows control circuitry comprising the controller 31 that is employed in the drive system 10 of FIG. 1. The controller 31 is coupled between the tachometer 23 and internal control circuits of the motors 12, 14. The controller 31 is comprised of an AC power source 33 that is coupled to each of the motors 12, 14. A position decoder 32 is coupled by way of an optional first phase sensitive detector 34 to a shaping amplifier circuit 35. The shaping amplifier circuit 35 is comprised of a shaping amplifier 36, and first and second filters 37, 38 that each comprise a resistor and a capacitor. The output of the shaping amplifier 36 is coupled to one input of a summing amplifier 41, whose output is coupled by way of a first control amplifier 42 to the internal control circuits of the first motor 12. The second input of the summing amplifier 41 is coupled to receive a torque bias input signal derived from a torque bias voltage source 46. The torque bias input signal is a fixed voltage that generates a desired torque difference between the output shafts 18, 19 of the first and second motors 12, 14. The output of the shaping amplifier 36 is also coupled by way of a second control amplifier 43 to the internal control circuits of the second motor 14. The tachometer 23 is coupled by way of an optional second phase sensitive detector 44 and a third filter circuit 45 to the input of the shaping amplifier circuit 35.

The controller 31 and system 10 operates as follows and will be described with reference to FIG. 2. In operation, and using AC motors as the motors 12, 14, for example, the first and second motors 12, 14 are powered by an AC voltage provided by the AC power source 33. Control voltages provided to each motor are independent of each other. A position transducer or sensor 32, such as an encoder or resolver, for example, provides position data from each of the first and second motors 12, 14. In addition, the tachometer 23 is utilized to provide rate data from each of the first and second motors 12, 14, by way of its respective motor shaft 18, 19. The position and rate data are combined using power techniques to compensate the overall servo loop for stable operation. This is accomplished by the shaping amplifier 36 and its associated components. Unlike a conventional servo design, the shaping amplifier output is routed to two independent outputs. The control amplifier for the second motor 14 has a conventional servo design, but the output for the first motor 13 has an additional summing amplifier that provides a desired level of anti-backlash torque. The anti-backlash torque may have either polarity, since it is always opposed by the torque from the second motor 14. The first and second motors 12, 14 turn at the same rate at all times since they are locked together by the split gear assembly 20 that is coupled to the drive gear 28 and output drive shaft 27 of the system 10.

Only one tachometer 23 is required by the system 10, since the speed of each motor 12, 14 is identical. The speeds are the same since the output shafts 18, 19 of each motor 12, 14 are locked together by means of the drive gear 29. The torques produced by the respective motors 12, 14 differ in sign, since statically, each balances out the other.

Although the above description has focused on the use of AC motors 12, 14, it is to be understood that DC motors and air motors may alternatively be employed as the situation and application requires. Accordingly, it is to be understood that the present invention is not limited to any particular type of motor or controller 31.

The drive system 10 of the present invention thus uses two axially mounted motors 12, 14 and gearhead assemblies 13, 15. The two motors 12, 14 and gearhead assemblies 13, 15 are mounted on concentric shafts 18, 19, and each shaft 18, 19 mates to the split gear assembly 20. The split gear assembly 20 is coupled to the drive shaft 27 of the device 30 that is to be driven. The tachometer 23 is coupled to the drive shaft 16 of the first motor 12 in order to derive rate data therefrom.

By controlling the torque provided by each of the two motors 12, 14, the split gear assembly 20 removes the backlash produced by the gearhead assemblies 13, 15 and interfaces between gears 21, 22 and the drive gear 29 and drive shaft 27 of the device 30 that is to be driven. The present invention does this as an integrated assembly 11, and is adapted to replace a conventional single gearhead motor, such as the MPC model 3439129 motor, for example.

Thus there has been described a new and improved drive system comprising an integrated gearhead motor assembly incorporating two motors and two gearhead assemblies that provides for relatively high torque output with minimal backlash. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A gearhead motor system for driving an output device, said drive system comprising:
   a first motor having a first motor shaft;
   a first gearhead assembly coupling the first motor shaft to a first output drive shaft;
   a second motor having a second motor shaft;
   a second gearhead assembly coupling the second motor shaft to a second output drive shaft that is concentric with the first output drive shaft; and
   a split gear assembly having first and second gear portions secured to said first and second output drive shafts respectively and having the first and second gear portions coupled by way of a drive gear to the output device.

2. The drive system of claim 1 which further comprises:
   a position sensor coupled to the drive gear for providing a position output signal indicative of the relative angular position of the drive gear and that is used to control the amount of torque provided by the drive system;
   a tachometer coupled to a selected motor that is adapted to provide an angular rate output signal that is used to control the amount of torque provided by the drive system; and
   control circuitry coupled to the tachometer, to the position sensor, and to each of the motors for control the amount of torque provided by the drive system to the output device in response to the position and rate output signals.

3. The drive system of claim 1 wherein the first and second motors are comprised of electric motors.

4. The drive system of claim 3 wherein the first and second motors are comprised of AC electric motors.

5. The drive system of claim 3 wherein the first and second motors are comprised of DC electric motors.

6. The drive system of claim 1 wherein the first and second motors are comprised of air motors.

7. The drive system of claim 1 wherein the first and second output drive shafts terminate in said first and second gear portions, and wherein said first and second gear portions are both in mesh with said drive gear.

8. A drive system that comprises an integrated gearhead motor system for driving an output device, said drive system comprising:
   a first motor having a first output shaft;
   a first gearhead assembly coupled to the first output shaft of the first motor and which comprises a first output drive shaft;
   a second motor having a second output shaft;
   a second gearhead assembly coupled to the second output shaft of the second motor and which comprises a second output drive shaft that is concentric with the first output drive shaft of the first gearhead assembly;
   a split gear assembly having first and second gear portions coupled to respective output drive shafts of the first and second gearhead assemblies, and having the first and second gear portions coupled by way of a drive gear to the output device;
   a position sensor coupled to the drive gear for providing a position output signal indicative of the relative angular position of the drive gear and that is used to control the amount of torque provided by the drive system;
   a tachometer coupled to a selected motor that is adapted to provide an angular rate output signal that is used to control the amount of torque provided by the drive system; and
   control circuitry coupled to the tachometer and the position sensor and to each of the motors for control the amount of torque provided by the drive system to the output device in response to the position and rate output signals.

9. The drive system of claim 8 wherein the first and second motors are comprised of electric motors.

10. The drive system of claim 9 wherein the first and second motors are comprised of AC electric motors.

11. The drive system of claim 9 wherein the first and second motors are comprised of DC electric motors.

12. The drive system of claim 8 wherein the first and second motors are comprised of air motors.

13. A drive system that comprises an integrated gearhead motor system for driving an output device, said drive system comprising:
   a housing;
   a first motor having a first output shaft;
   a first gearhead assembly coupled to the first output shaft of the first motor and which comprises a first output drive shaft that projects from an opening in the housing;
   a second motor having a second output shaft;
   a second gearhead assembly coupled to the second output shaft of the second motor and which comprises a second output drive shaft that projects from the opening in the housing and which is concentric with the first output drive shaft of the first gearhead assembly;
   a split gear assembly having first and second gear portions coupled to respective output drive shafts of the first and second gearhead assemblies, and having the first and second gear portions coupled by way of a drive gear to the output device;
   a position sensor coupled to the drive gear for providing a position output signal indicative of the relative angular position of the drive gear and that is used to control the amount of torque provided by the drive system;
   a tachometer coupled to a selected motor that is adapted to provide an angular rate output signal that is used to control the amount of torque provided by the drive system; and
   control circuitry coupled to the tachometer and the position sensor and to each of the motors for control the amount of torque provided by the drive system to the output device in response to the position and rate output signals.

14. The drive system of claim 13 wherein the first and second motors are comprised of electric motors.

15. The drive system of claim 14 wherein the first and second motors are comprised of AC electric motors.

16. The drive system of claim 14 wherein the first and second motors are comprised of DC electric motors.

17. The drive system of claim 13 wherein the first and second motors are comprised of air motors.

* * * * *